Oct. 2, 1962 — A. F. NAYLOR — 3,056,303
HYDRAULICALLY AND SPHERICALLY SUPPORTED INERTIAL REFERENCE
Filed Aug. 29, 1958 — 3 Sheets-Sheet 1

Inventor
Arthur F. Naylor

Inventor
Arthur F. Naylor

United States Patent Office 3,056,303
Patented Oct. 2, 1962

3,056,303
HYDRAULICALLY AND SPHERICALLY SUPPORTED INERTIAL REFERENCE
Arthur F. Naylor, Cleveland, Ohio, assignor to Thompson Ramo Wooldridge Inc., Cleveland, Ohio, a corporation of Ohio
Filed Aug. 29, 1958, Ser. No. 757,990
13 Claims. (Cl. 74—5.34)

This invention relates to a construction for stable platforms and inertial references. More particularly, this invention relates to an improved, ruggedized stable platform from which measurements can be made to indicate the angular position and/or translational accelerations, velocities and position of a vehicle with reference to inertial space, to the earth, or to any other suitable coordinate system.

A basic feature of this invention is the hydraulic or fluid support of an inner sphere within an outer sphere while maintaining full all-attitude capability which will allow the vehicle to which the outer sphere is attached to assume any attitude or to make any succession of maneuvers throughout which the inner sphere will maintain a fixed or stable position relative to inertial space or any other pre-selected coordinate system. The inner sphere contains the stabilization gyros and/or the accelerometers required for any particular application and is hydraulically suspended in the outer sphere which in turn is rigidly mounted to the vehicle and is free to revolve in all directions about the inner sphere. The conventional gimbal structure and its many associated components are thus completely eliminated. Suitable torquers, pick-offs, power transmission, and signal transmission devices are integrated into the spheres.

The stable platform construction of the present invention provides a considerably more rugged and reliable device than has heretofore been available; it eliminates the difficult cascaded hard-point suspension problems of prior gimbal structure (and especially the problems of such a structure in the presence of vibration and impact); it eliminates the dynamic inertial couplings inherent in all specifically gimballed instruments; it greatly reduces the necessary size and weight for an inertial reference of any particular performance capability; and it provides a substantially greater inherent simplicity which, in turn, leads to reduced costs of manufacture.

The suspension technique of the present invention is applicable either to an angular reference or accelerometer stable platform or to a complete inertial reference system, and is further applicable over a large range of required instrument accuracy and performance with the accuracy dependent principally upon the qualities of the gyros and accelerometers chosen for use in the inner sphere. The outputs from the inertial reference include, first, the angular output describing the relative position of the two spheres in terms such as the three middle rotation angles of the Eulerian coordinate transformations and, second, signals (preferably digitalized) indicative of the vehicle accelerations velocities and/or positions along two or three mutually perpendicular axes. Instrumentation suitable for any particular application can provide either a true inertial coordinate system or a Schuler-tuned, earth-referenced coordinate system. If floated type gyros and accelerometers are used, there are no mechanically suspended gimbal axes anywhere in the complete instrument.

The essential construction for any application can include provision for simultaneously transmitting the required torques, electrical power, sensor signals, and angular position information between an inner sphere hydraulically supported within an outer sphere. Inertial references embodying the concept of the present invention are applicable, with suitable instrumentation, to a wide range of vehicles including ballistic, interceptor, and bombardment missiles, space and satellite vehicles, manned airplanes and advanced manned vehicles, and are, with a fraction of the size and weight, superior to conventional units in their ability to operate with a high degree of accuracy during and after conditions of extreme vibration and acceleration.

The device of the present invention may conveniently be referred to as the "HASSAD" inertial reference. The letters in the word "HASSAD" stand for "Hydraulically and Spherically Supported Analog-Digital" inertial reference. As implied by this name, some of the output information is preferably in digital form. It should, however, be understood that the particular instrumentation or mode of output information utilized may vary from one application to another and is not essential to the basic concept of the hydraulically and spherically supported inertial reference.

It is then an object of this invention to provide a hydraulically and spherically supported stable platform or inertial reference.

It is a further object of this invention to provide a rugged inertial reference or stable platform construction affording reliable operating characteristics.

It is a further object of this invention to provide an inertial reference or stable platform construction which eliminates conventional gimbal structure and the associated cascaded hard-point suspension problems thereof.

It is a further object of this invention to provide an inertial reference and stable platform construction which eliminates the dynamic inertial couplings inherent in all specifically gimballed instruments.

It is a further object of this invention to provide an inertial reference and stable platform construction of substantially less size and weight for a reference of any particular performance capability than has heretofore been available.

It is a still further object of this invention to provide an inertial reference or stable platform construction of greater inherent simplicity than previously known devices and hence to reduce the cost of manufacture thereof.

While the novel and distinctive features of the invention are particularly pointed out in the appended claims, a more expository treatment of the invention, in principle and in detail, together with additional objects and advantages thereof, is afforded by the following description and accompanying drawings in which like reference characters are used to refer to like parts throughout and wherein:

Figure 1:
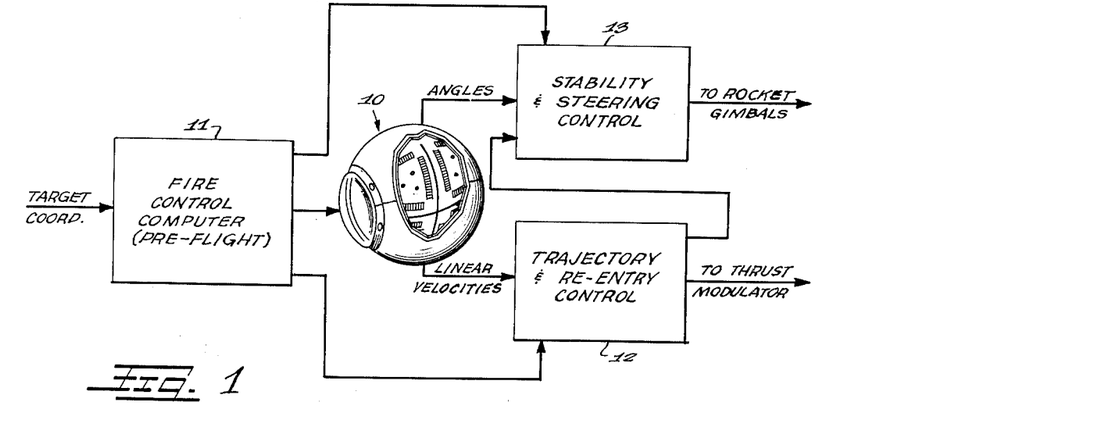
FIGURE 1 is a block diagram illustrating a typical systems application in which the inertial reference of the present invention may, for example, suitably be used.

In FIGURE 1 there is illustrated one typical manner in which an inertial reference 10 in accordance with the present invention may be used in a ballistic rocket vehicle. Starting at the left side of the figure and progressing across, the target data consisting of position and ancillary information is first fed into the fire control equipment 11. This equipment computes the target aiming coordinates and the trajectory necessary for the vehicle to arrive at the target position at the time of impact. Output from the fire control equipment is sent to the inertial reference and to the programmers which are in the control units 12 and 13. During flight, the programmer of control unit 13 compares the programmed course as defined by the fire control computer with the outputs from the inertial reference system indicating the actual course being followed. Any error in trajectory is introduced to the flight control equipment 13 which steers the vehicle on the proper course. Steering is of course accomplished through the stabilizing section of unit 13 where platform angles and local feed-backs (accelerometers for measuring vehicle accelerations, angular velocity measurements, and derived derivatives) are combined to produce a stable flight attitude. The trajectory control 12 produces the required outputs to control the thrust (and hence the speed) or thrust termination of the rocket engine.

Although FIGURE 1 illustrates broadly one typical manner in which the inertial reference device may be used in a ballastic rocket vehicle, it will be understood that the qualities to be described herein for the HASSAD inertial reference system are equally applicable to a HASSAD stable platform system which provides only the angular coordinate outputs. The device can be implemented over a wide range of instrument accuracies and types to suit any particular application and is useful in many different types of vehicles where it is necessary to maintain accurate instrumentation during a rugged environmental life and with a small package size.

Figure 2:
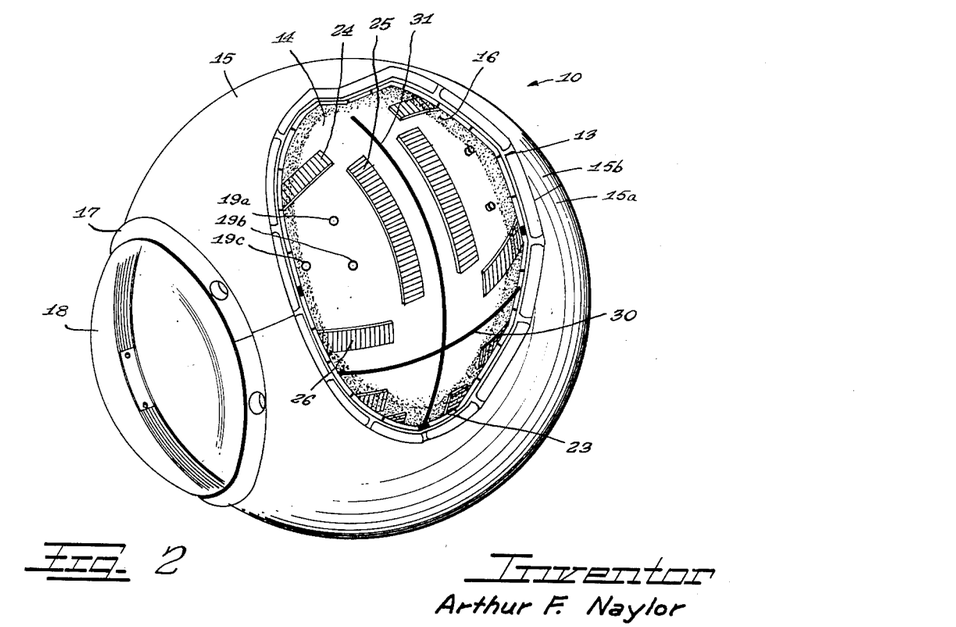
FIGURE 2 is a perspective view with parts cut away showing the hydraulically and spherically supported inertial reference construction.

The HASSAD concept of spherical construction may be seen more clearly in FIGURE 2 and is based upon simultaneously hydraulically supporting the inner sphere within the outer sphere, transmitting electrical power between the spheres, effecting the required torque between the spheres, transmitting sensor and control signals, and obtaining angular output information which describes the relative position of the two spheres. The manner in which this is accomplished may be seen more clearly by reference to FIGURE 2.

In FIGURE 2 there is shown an inner sphere 14 supported within an outer sphere 15 by rotation on a thin layer of suitable fluid 16. Fluids of either the silicone type or the fluorolube type can be used for the fluid 16, the choice being based primarily upon the desired specific gravity. Other fluids, both liquid and gas, could also be used and the term "hydraulically" supported as used herein encompasses all such fluids. A fluid thickness of approximately 0.010 inch affords a satisfactory compromise between the mechanical problems of suspension and centering and the torquer motor gap requirements to be discussed in detail below. That portion of the mass of the inner sphere 14 which will remain unfloated will depend primarily upon the variation in specific gravity of the fluid with changes in temperature and the degree of temperature stability. Fluorolube is slightly superior to silicone in this respect and exhibits a change of 1% in specific gravity for a 45° F. temperature change. Rigid temperature control of the stable platform is therefore not required to satisfy the requirements of spherical construction but may in some applications be desirable to satisfy the temperature control requirements of the gyros and accelerometers used inside the inner sphere.

In the construction of the device, it is possible to first assemble the inner sphere 14 and the components contained therein and then to assemble two separate portions 15a and 15b of the outer sphere 15 around the inner sphere 14. The portions 15a and 15b may conveniently be substantially hemispherical and are also provided with a collar portion 17 in which an end plug 18 may be fastened. That is to say, the two typical portions 15a and 15b are first attached together surrounding the inner sphere 14 by any suitable means such as tongue and groove construction, straps, or other holding means, and next the supporting fluid is introduced between the spheres before insertion of the member 18 which may be screw threaded into collar 17.

In addition to the floatation of most of the mass of the inner sphere 14, additional means are provided for centering the inner sphere within the outer sphere and for carrying the required unfloated load. In FIGURE 2 these centering means are shown as comprising small centering pins such as the pins 19a, 19b, and 19c. These pins are fastened to the inner sphere and rub in sliding friction against the inner surface of the outer sphere. Either a plastic such as "Teflon" or any suitable metallic centering pins may be used. Preferably, these pins are arranged symmetrically with three or more bearing elements in each of the eight quadrants of the sphere, the pins 19a, 19b and 19c, comprising the arrangement which is repeated in each of the eight quadrants.

Transmission of electrical power from the outer sphere to the inner sphere and of signals from the inner sphere to the outer sphere is achieved through multiplexing of a single conduction path utilizing as the conductors one opposing set of centering pins. That is to say, the set of three pins 19a, 19b, and 19c, or more in each of two opposed quadrants of the eight quadrant sphere are used as contact elements between the inner and outer spheres. As will be discussed in detail below in connection with FIGURE 3, it will be noted that the inner surface of the outer sphere is composed of a plurality of segments 23 of conductive material separated by insulating strips. The three or more pins in each set of the two closed conductive sets are connected in parallel and are so arranged that at least one of the pins is always positioned on an energized conductive segment of the inner surface of the outer sphere.

In addition to the above discussed arrangement to allow uninterrupted transmission of power regardless of the angular orientation of the two spheres, there remains a second arrangement to perform all of the required functions with a single transmission circuit. In most applications of internal references and stable platforms the use of power and signal transmission may be categorized into three groups:

(1) Power transmission for gyro motors, gimbal or principle axis torque motors, and other heavy uses;

(2) Signal used for the excitation of critical pick-offs and sensing devices;

(3) Signals used to transmit certain output data such as precession axis, pick-off positions or to transmit certain input data such as gyro torque motor commands.

Frequency and time multiplexing techniques well known in the art may be used to provide for the three types of transmission on a single circuit. Thus, 400 cycle energy may be transmitted into the platform for use as gyromotor excitation and for the principle axis torquer excitation. Any well known suitable type of switching circuit inside the inner sphere may control the application of this available 400 cycle power to the torque motor in accordance with command information. Simple relay circuitry may, for example, be used. The second frequency is preferably in the general range of 2100 cycles to be used for the excitation of critical or sensitive analog pick-off elements such as gyro precession axis pick-offs and accelerometer pick-offs. The frequency span between 400 cycles and 2100 cycles is sufficient to premit the use of simple filtering techniques to separate the two frequencies to give very adequate performance. The third frequency may preferably be in the form of pulses with a repetition rate of about 20 kc. to 50 kc. These pulses may, for example, be used to transmit information in a digitized form both into and out of the inner sphere. Information going to or coming from different components may, of course, be transmitted on a time multiplexed or time sharing basis by these pulses.

Figures 3, 4:
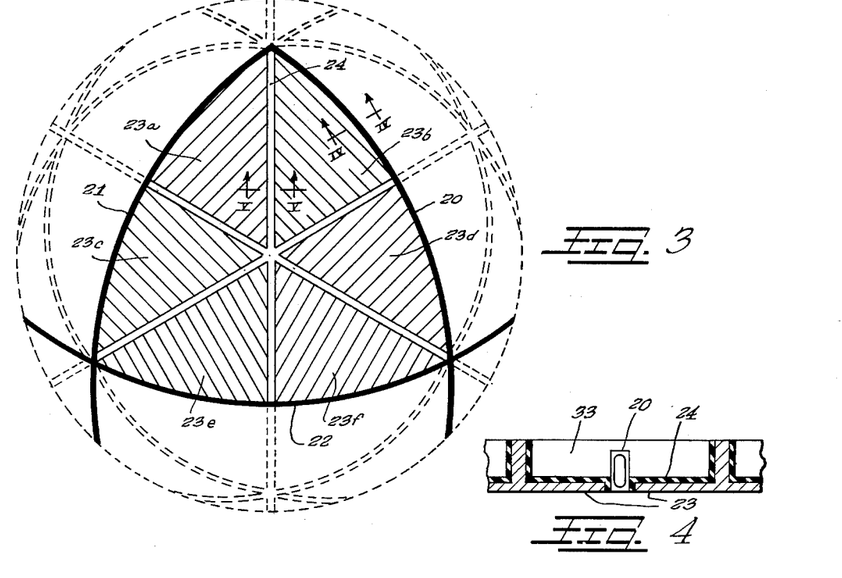
FIGURE 3 is an orthographic projection of the inner surface of the outer sphere onto a plane tangent to the sphere at the geometric center of the upper quadrant bounded by the 0° and 90° meridians and the equator.
FIGURE 4 is a sectional view taken on the line IV—IV of FIGURE 3 and showing the construction of a typical angular read-out device.

In FIGURE 3 there is shown an orthographic projection of the inner surface of the outer sphere 15 onto a plane tangent to the sphere at the geometric center of the uppper quadrant bounded by the 0° meridian 20, the 90° meridian 21, and the equator 22. This view shows one preferred configuration for the conductive inserts 23 such as 23a, 23b, 23c, 23d, 23e and 23f on the inner surface of the outer sphere of the stable platform. As shown in FIGURE 3, six segments per quadrant can be used giving a total of 48 segments for the complete sphere. The boundary or separating material 24a between each of the segments consists of an insulating material such as a plastic or rubber and in the case of the meridians 20 and 21 and the equator 22, also includes the angular pick-off receiver to be described in greater detail below. In FIGURE 3 the members in one quadrant are shown in solid line and dotted lines are used to show the other members which would be visible in the particular projection shown but would be in other quadrants.

It is thus noted that the inner surface of the outer sphere contains a number of spherical segmental inserts, each electrically insulated from the adjoining segment. In operation, the current flow through the segments being used to form the above discussed single conduction path at any one time, that is, the opposing pair of segments which are in contact with the conductive centering elements, is sensed and power is applied on the outer sphere only to that pair of segments and to those segments immediately adjoining each of the conductive pair. As relative motion occurs between the two spheres, power is transferred, segment by segment, in accordance with the instantaneous requirements of the geometry thus permitting complete all attitude operation of the stable platform. To facilitate this action, conductive pins such as 19a, 19b, and 19c, are connected in parallel to prevent the interruption of power as the boundary line between the sectors is crossed by any one of these pins. The configuration of pins, of course, is such that at least one pin is always on the designated segment or an excited adjacent segment.

In practice a separate connection is made to each of the segments of the inner surface of the outer sphere and brought out via a cable (not shown) projecting through plug 18 to an appropriate external control circuit and power supply. The application of power to selected ones of these separate conductors may be controlled by any conventional logic circuitry to insure that at any given time a selected primary segment and each segment adjoining this segment is connected in circuit. As the inner sphere rotates, the primary connection will be open circuited when it moves out from under the conductive pins and the circuit is closed through an adjoining energized segment. The control or logic circuit of course treats the segment through which the circuit is completed at any position as the primary segment and acts to energize all segments adjacent to it. Thus, at any instant the primary segment is energized and in closed circuit whereas the adjoining segments are energized but in open circuit relationship. These energized, but not yet connected through, adjoining segments are thus ready to be used without interruption of the power transfer when the boundary is crossed, as explained below. It will of course be understood that many different circuits may be used to accomplish this power transfer in any given application without power interruption as the boundaries between the sectors are crossed. For example the circuit from each segment may include a current operated relay which is mechanically gauged to close switches applying power in parallel to the circuits of all adjacent segments whenever the current sensitive relay is actuated. Thus, the primary segment and all adjacent segments are placed in parallel circuit relation. Suitable holding circuits or relays may be included to prevent deenergization of adjacent segments until a new primary circuit is made when boundaries are crossed. In initiating operation power may either be applied to the correct primary circuit from the known relative positions of the spheres or test signals may be applied to all circuits to determine this position.

It will further be understood that such control or transfer circuitry is located external to the inertial reference device proper and may suitably be housed in an adjoining control cabinet.

It will be noted from FIGURE 3 that the six segments per quadrant are so arranged that in going from pole to pole along any meridian or by any other path, one necessarily traverses or touches at least parts of a minimum of six segments. This traversing or touching includes engaging the point of, or the corner of, a segment. Although a different number of segments may be preferred in many applications, it has been found that this number of six segments on a pole to pole path is acceptable to permit the above described power transfer operations.

In order to maintain the inertial stability of the inner sphere, it is necessary to use three stabilization controls such as are typical in all stable platform systems. These stabilization sub-systems must include means for exerting torques from the vehicle or plane to the stabilized member which, in the present instance, is the inner sphere.

As will be explained in greater detail below, some advantages accrue in the case of spherical construction because optimum alignment can always be maintained between the torquing devices and their respective gyros and because physical gimbals need not be accelerated at any flight attitude by the torque-producing means.

In order to produce the necessary torques, three sets of 400 cycle, two-phase induction motors operating generally at or near stall may be used. The wound stator sections 24, 25, and 26 of these torque motors respectively are mounted on the inner sphere as shown in FIGURE 2, each being aligned with its proper gyro mounted inside the sphere. Since the volumetric efficiency of these torquers is much greater than is required for the torques encountered in the device, segmented torque motor stators may be used and include the segments 24, 25, 26, shown in FIGURE 2. The arrangement of these torquer segments about each axis is symmetrical. Motors of this type have been commonly used in gyro instruments for many years but generally are used in conjunction with the rotor consisting of a bar-and-slot configuration. The bar-and-slot configuration of the rotor, however, requires a specific orientation with respect to the stator and thus would not be suitable for the spherical application shown herein. Experiments have shown that induction motors of this basic type can be operated with only about a 20% to 30% loss in torque-per-unit power ratio with a non-oriented rotor material such as iron or a sinter of aluminum and iron or of copper and iron. Thus the rotor units for these three two-phase induction motors are provided by the inserts 23 which are composed preferably of such a material, each insert being electrically isolated in the manner discussed above. These torquers operate or act in the well known fashion of two-phase motors with the sintered material acting somewhat like, or in lieu of, the above-mentioned bar and slot configurations.

As previously suggested, signal communication between the spheres is preferably accomplished by means of pulses indicative of the required information in digitalized form. The typical exemplary significant signals which may be transmitted in an inertial reference system include gyro pick-off outputs, accelerometer outputs, gyro torquer command signals and gimbal or principal axis torquer command signals. All of these requirements can easily be handled by conventional digital data transmission techniques using a pulse rate of approximately 50 kc. and a $\frac{1}{25}$ second data cycle. Considering first the transmission of analog gyro pick-off signals from the inner sphere to the outer, a single simple form of analog to digital converter can be included in the inner sphere and controlled so as to scan the several required outputs in a sequential fashion and transmit pulses indicative of the digitized equivalent of the instantaneous error signals. The incorporation of a transistorized converter and encoder is believed to be readily within the skill of those in the art and is therefore not illustrated in detail. The nature of the requirements for the use of this signal is such that it is digitized with a very high resolution for a very short range near null, and a maximum or saturation signal is generated for any position beyond this range.

In the case of the accelerometer outputs, several different types of instrumentation may be used. Some singly integrated accelerometers have a self-contained digital output, and this can be simply programmed on the digital data link between spheres. In some other types of accelerometers, such as the force balance or pendulous accelerometer, the feed-back loop can be closed within the inner sphere in such a way that the feed-back element or torquer receives a series of pulses of constant amplitude and duration rather than of varying magnitude. These pulses can be counted for a short period of time and this incremental count transmitted. A count of the number of pulses is indicative of the acceleration being experienced and the accumulated value, as accumulated in a register outside the stable platform, is indicative of the translational velocity.

Since, in general, it is desired to energize the torquers on the precession axis of the gyro in accordance with certain systematic and non-systematic corrections, and in the case of a Schuler-tuned platform in accordance with the first integral of the accelerometer outputs, circuitry is included to transmit these desired torquer commands to the inner sphere over the above discussed data link between the spheres. By way of example, a very simple pulse code may be used for this purpose to transmit for each increment of time a zero, plus torque or minus torque signal. The abovementioned switching circuit for the torquers working in response to this code then applies the required power to the torquer. The calibration of the torquer is then required for only a single height and duration of pulse. All of the torquers requiring this type of operation may be operated on a time sequential basis from a single data circuit.

The remaining requirement encountered in a typical instrumentation of the device of the present invention is that of signal transmission for controlling the principal axis torquers, that is, the torque motors comprising stators 24, 25, 26 and the distributed rotors 23. In typical applications, the maximum torque required for each torquer may vary depending upon the size of the platform. Any suitable gating or relay circuit may be used to accept coded control signals as described above for the gyro torquers and in response thereto to gate the required amount of, typically, 400 cycle power to the two phases of the torque motor. One space phase of the motor is energized with a particular time phase for either polarity of the signal, and the other space phase of the motor has its time phase controlled in accordance with the positive or negative indication on the control signal. Preferably, the gating circuit should be transistorized in order to reduce its size and weight to obviate the requirement for bulky equipment.

Figures 5, 6:
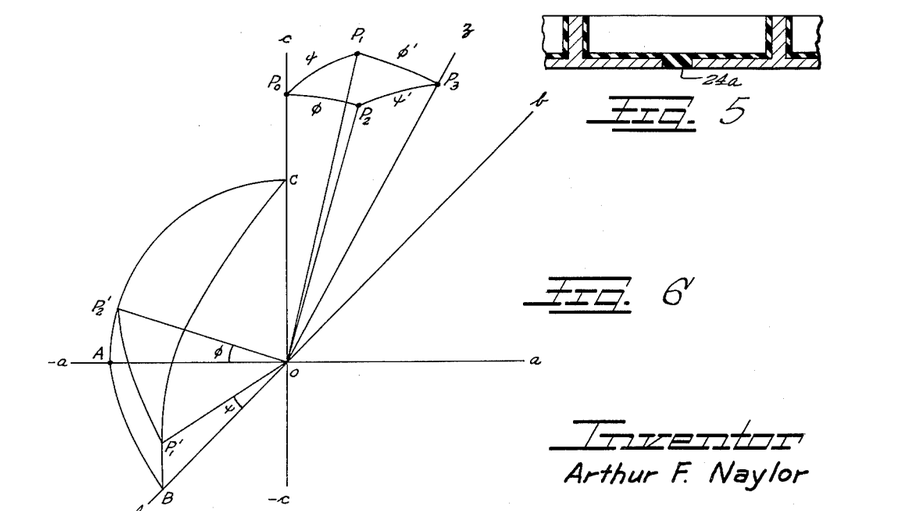
FIGURE 5 is a section taken on the line V—V of FIGURE 3.
FIGURE 6 is a graph illustrating the three dimensional angular pick-off geometry of the present device.

Another requirement for the stable platform inertial reference system is the provision of outputs indicative of the angular position of the vehicle relative to a desired stabilized coordinate system. In order to accomplish this in the case of the spherical configuration shown, two steps are necessary. The first is to provide a significant, systematic and non-ambiguous coordinate system applicable to the spherical geometric system, and the second is to provide pick-off devices to implement this system. The coordinate system used should preferably be compatible with and integrated with the spherical structure rather than be an adaptation of coordinate systems better suited to other geometries. In FIGURE 6, there is shown a diagram illustrating the angular pick-off geometry of the pick-off elements shown in FIGURES 2 and 3.

To establish the desired coordinate system, imagine first on the inner sphere an equator running about the sphere and forming a plane perpendicular to the sensitive axis of the azimuth gyro within the sphere. Consider also a meridian line running from pole to pole of the inner sphere and in such a position that it can be referred to as the 0° meridian. On the outer sphere, as shown in FIGURE 3, a similiar definition is made consisting of an outer sphere equator 22 and two outer sphere meridian lines, one line 20 being taken as a 0° position and the other line 21 being in a 90° position around the equator. It can be assumed that when the vehicle is being flown so that the inner and outer equators and the inner and outer 0° meridians are coincident, this position is taken as the origin for angular measurements. It is further assumed that the zero degree meridian on the outer sphere is perpendicular to the transverse axis of the aircraft. Inspection will now indicate that for a simple pitch maneuver of the aircraft, the amount of pitch is indicated by the point on the outer sphere zero degree meridian where it is intersected by the inner sphere equator. If the aircraft undergoes a simple roll maneuver the amount of roll is indicated by the point on the outer sphere 90° meridian where it is intersected by the inner sphere equator. A simple change in azimuth is indicated by the position on the outer sphere equator where it is intersected by the inner sphere 0° meridian. Due to the basic spherical geometry involved, there is always a one to one correspondence in the angular output as evidenced by these intersections and the aircraft maneuver for the case of simple, that is, single-axis disturbances.

The significance of outputs obtained in this fashion for compound motions about several axes now remains to be developed.

In FIGURE 6 there is illustrated a compound maneuver such as a combined pitch and roll which is shown here by a compound rotation of the Z axis of the inner sphere in relation to the $a$, $b$, $c$ axes of the outer sphere by two routes: $\psi$ then $\phi'$; or $\phi$ then $\psi'$.

For the first route $P_0 \rightarrow P_1 \rightarrow P_3$, first rotate angle $\psi$ about axis $a$ then angle $\phi'$ about $OP_1'$. Angle $\phi'$ equals $AP_1'P_2'$. For the second route, $P_0 \rightarrow P_2 \rightarrow P_3$ first rotate angle $\phi$ about axis $b$, then rotate angle $\psi'$ about $OP_2'$. Angle $\psi'$ equals $BP_2'P_1'$. These relationships are true since the last two rotations may be taken in either order and in view of the well known relationships of the Eulerian geometry as explained in this connection in the paragraph immediately below. For either route $OP_1'P_2'$ forms the plane of the inner sphere equator, and $P_1'$ and $P_2'$ are intersections of the inner sphere equator with the outer sphere meridians (BC) and (AC).

With reference to FIGURE 6, consider the case of obtaining the pitch and roll outputs for compound maneuvers and their relationship to the familiar Eulerian transformation angles of a specifically gimballed instrument. Since the inner sphere equator is a common (unipotential element), any amount of previous azimuth rotation may be assumed without changing the relative position of the inner sphere equator with the outer sphere 0° and 90° meridians, and this azimuth rotation may be considered as the initial Eulerian rotation. The remaining two rotations may be taken in either order, mainly, first pitch then roll or first roll and then pitch. The angles generated in making the second and third rotations are illustrated in FIGURE 6 and are designated $\psi$ then $\phi'$ and $\phi$ then $\psi'$. The angles $\psi$ and $\phi$ as shown in FIGURE 6 are the output angles detected by the system of the equator and meridians described. Thus, the output angles have the significance of being the middle rotation angles in the matrix of Eulerian transformation equations. In the case of the azimuth, the output obtained from the intersection of the inner 0° meridian with the outer sphere equator also has the significance of being the middle rotation angle in the Eulerian transformations.

The angles formed by the desired system of pick-offs are, therefore, a significant, systematic, non-ambiguous set of coordinates and have maximum suitability to the spherical configuration. The outputs from this geometry are used directly for many applications, and in many cases have a better correspondence to desired angles than is afforded by the utilization of the gimbal angles of a specific gimballed instrument. Alternatively, the outputs from this geometry can be simply converted to any desired set of Eulerian angles or they can be used directly for direction cosine transformations.

Having established the desired geometry for a possible output coordinate system, consideration will now be given to the instrumentation of the pick-offs as illustrated in FIGURES 2, 3 and 4. As noted above, the boundary materials between the segments on the inner surface of the outer sphere are always of an insulating material and in the case of the 0° and 90° meridians and of the equator, also include the angular pick-off receiver which is preferably in the form of a capacitive pick-off potentiometer. Thus, in FIGURE 2 the equator 30 of the inner sphere may be formed by one insulated strip conductor which in the pick-off will form one plate of a capacitor. Similarly, the zero degree meridian 31 of the inner sphere may also comprise an insulated conductor which will be suitably actuated in a manner to be described below and will form a plate of another capacitive pick-off. In like fashion, the equator 22 on the inner surface of the outer sphere, the 0° meridian 20 and the 90° meridian 21 on the inner surface of the outer sphere form the other plates of the pick-offs while their distributed resistance affords potentiometer action. As may be seen in FIGURE 4 by way of example, the pick-off receiver 20 comprises a resistive conductor to form a well known slide-wire-type of potentiometer as a receiving element on the inner surface of the outer sphere. This receiver 20 is recessed in a structural member 33 forming part of the outer shell of the outer sphere and separated from the adjacent conductive segments 23 by insulation 24a. A similar construction may be used for each of the other pick-off members such as 21 and 22. These potentiometer-type pick-offs or receivers 20, 21 and 22 operatively cooperate as the receiving elements for circular wiper arms used on the inner sphere to transmit suitable signals to the receivers, as will be well understood by those skilled in this art. Since the centering means between the two spheres assures constant centering and precludes acceleration loading, very low spring forces can be used in such a potentiometer contact assembly. In FIGURE 5, the insulation 24a serves to support the conductive portions as shown. It should be noted, however, that all of the pick-offs for the meridians, that is to say, the 0° and 90° meridian for the outer sphere and the 0° meridian for the inner sphere may extend through only 180° of arc whereas the pick-off members on the equators of both the inner and outer spheres extend through substantially 360° of arc. Each of the transmitting members is connected for suitable electrical actuation to supply a suitable signal thereto, as will be well understood by those skilled in this art. Such a current or signal is supplied to each such transmitting member. To avoid interaction between the inner sphere equator and meridian, the equator may be pulsed through a diode on one-half of each cycle of the 400 cycle carrier and the meridian may be pulsed on the other half cycle.

Of course, distributed inductive devices as a receiver mounted on the inner sphere and a high frequency inductive field generator mounted along the equator and meridian of the inner sphere could also be used. In this latter arrangement the point of influence of the field caused by the inner sphere would be indicative of the desired output angle.

An example of the means which could be used for this embodiment would be the use of simple wires along the contours of the equator and meridians of the inner sphere and the use of magnetostrictive tubes as the distributed inductive receivers mounted along the contours of the meridian and the equator of the outer sphere. As is well known, when a conuctive wire such as that intended for the inner sphere component, is pulsed with electrical energy, including suitable high frequency components so as to emphasize the leading edge of the energy wave, a transient inductive field is generated which will intersect the magnetostrictive tube fixed to the outer sphere. This inductive field will initiate a magnetostrictive wave within the tube and this wave will propagate towards the ends of the tube with a velocity which is characteristic of the tube. The interval of time between the application of such a pulse of energy to the inner sphere conductive wire to the receipt of the propagated magnetostrictive wave at the end of the magnetostrictive tube may be measured by any conventional means and this interval of time is proportional to the angle included between the point of intersection and the end of the magnetostrictive tube. The time of the receipt of the propagated wave at the end of the tube can be determined by the appearance of an output voltage from an output transducer consisting of a coil of wire wrapped around the magnetostrictive tube at its end position. As will be understood by those skilled in this art, other combinations or types of such inductive and high frequency devices may be used on the inner and outer spheres to implement this pick-off function.

Figure 7:
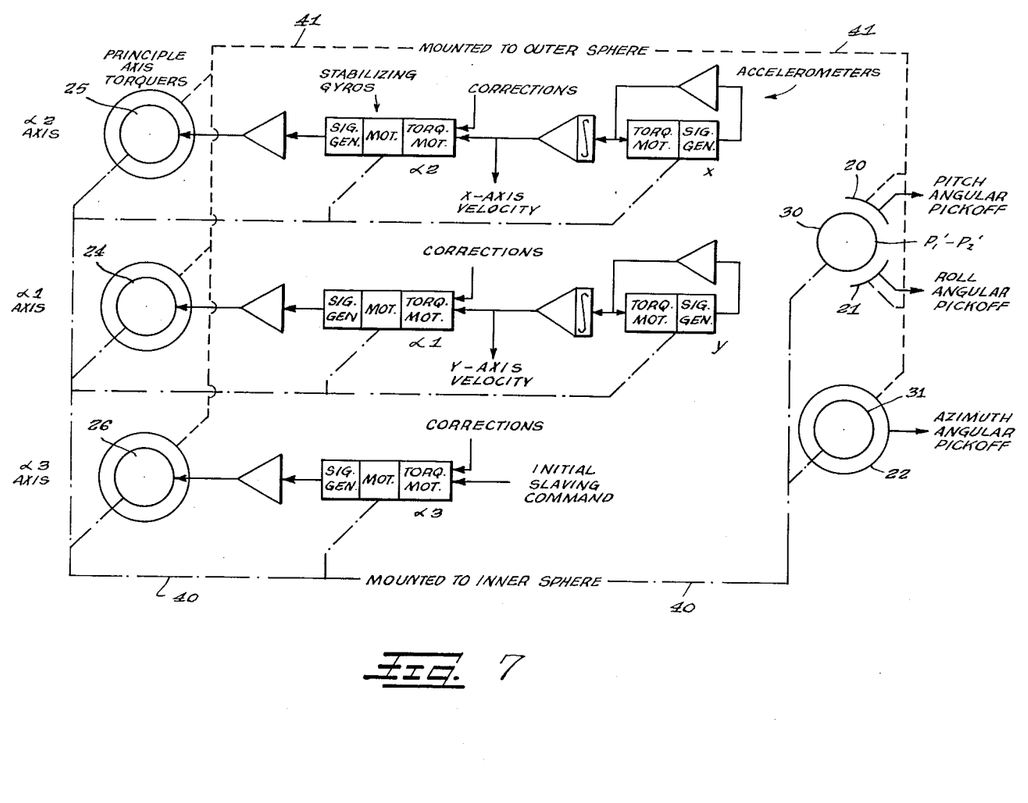
FIGURE 7 is a simplified functional block diagram showing a typical stabilization system suitable for use with the present invention.

In one exemplary embodiment of an all-attitude full inertial system three floated gyros of the conventional "MIG" type and two compatible accelerometers are used to provide a full inertial reference. These components may be mounted as schematically shown in FIGURE 7 which is a simplified functional block diagram of a Schuler-tuned inertial velocity meter illustrating one possible known mode of interconnection and usage of three gyros and two accelerometers of a conventional type suitable for use in the stable platform construction of the present invention. The three floated gyros and two floated pendulous accelerometers are mounted within the inner sphere by any convenient mechanical means to provide such a floating mounting therefor. These two accelerometers are responsive to motions about two of the gyro axes, as will be well understood by those skilled in this art. It has been found, for example, that this may be accomplished with a measurement unit having an overall diameter of approximately 8.5 inches and having a spherical interface diameter of approximately 7.2 inches. Such an exemplary instrumentation of course provides both angular position and translational velocity outputs and embodies a stabilization sub-system, an orientation sub-system, and an output sub-system.

As shown in FIGURE 7, the stabilization sub-system is composed of three identical control loops of a commonly used type which maintain the angular stability of the inner sphere in its prescribed orientation independently of the disturbance caused by the motion of the aircraft. In FIGURE 7, the parts connected by the dashed dot line 40 are mounted to the inner sphere and the parts connected by the dashed line 41 are mechanically mounted to the outer sphere. Thus, the two accelerometers (indicated by the single legend) and the three gyros (indicated by the single legend in this FIGURE 7) are all in the inner sphere, as explained above. Thus, in the pick-off elements, the inner sphere equator 30 and 0° meridian 31 are indicated by the inner circles whereas the outer shpere meridians are indicated by segments 20 and 21 and the outer sphere equator by circle 22. Similarly, the inner sphere torque motor stators are indicated by circles 24, 25, and 26. As may be deduced from the description of FIGURE 6, the axes of the inner sphere are considered as an X, Y, Z, system of axes, of which only the Z axis is shown in FIGURE 6, whereas the axes of the outer sphere are taken as an *a, b, c,* set of axes. In FIGURE 7, the axes designated as 1, 2 and 3, respectively, in connection with the three loops of this figure are intended to correspond respectively to the *a, b* and *c* axes of FIGURE 6. Each of the above-noted three control loops includes a gyro signal generator, an amplifier, a principal axis torque motor and mechanical feed-back coupling back to the gyro input axis which last is not shown in this FIGURE 7 but which will be readily understood by those skilled in this art from this disclosure.

The operation and function of each of the three loops of FIGURE 7 will be apparent from the immediately following paragraph. In these three loops, it is to be noted that the first two, or the X loop and the Y loop, each include one of the two accelerometers which are indicated by the single legend in this FIGURE 7. In these loops, the corrections and the initial slaving commands referred to in the legends of FIGURE 7, are supplied as described above. The X axis and Y axis signals of this FIGURE 7 are supplied to the outer sphere as shown in this figure and as described below and are thus used to control the vehicle or aircraft by suitable means as described above.

The gyro signal generator is preferably of the conventional type whereas the principal axis torquer is of the non-oriented rotor type shows in FIGURE 2. Other than the gyro, its signal generator and the principal axis torquer, the remaining component of the control loop is the implementation of the amplification and transfer function between the pick-off and the torquer. The output from the pick-offs is preferably converted into digital form on a time sequential basis and the digitized output transmitted to the outside sphere by means of a pulsed code.

The necessary functional amplification is conveniently performed external to the stable platform by either analog or digital techniques conventional in the art. The resulting torquer commands are then transmitted into the platform preferably in the form of a ternary command, that is, positive, off, or negative. The bistable elements which may represent this output receive new data in pulse form at a frequency which may, for example, be 25 cycles per second and maintain the output during the period of time between pulse cycles. The remaining function of utilizing the coded information to energize the appropriate principal axis torquer with signals of the proper phase as commanded may conveniently be performed by any suitable switching circuit such as relays actuated by the coded command to properly apply the typically, 400 cycle power to the torquer motors.

The orientation sub-system includes the operation of the accelerometers, the operation of the Schuler-tuned orientation loop, the velocity output and the directional slaving loop. Small size high accuracy floated pendulous accelerometers are preferably used. As shown in FIGURE 7, the accelerometer is kept aligned in its nulled positions by means of a feed-back torque supplied by the accelerometer torque motor. The amplifier performing this function is preferably of the type described above which energizes the torquer with pulses of standard amplitude and duration but of varying frequencies. More specifically, the amplified accelerometer error signal may be sampled to determine its polarity and whether it is greater in magnitude than either of two pre-set levels. The output of this simple four level quantizer indicates if a high or low level pulse is to be applied to the torquer and if so, of which polarity. In addition to pulsing the torquer, pulses are counted in a reversible counter with provision for inserting pulses at two points in the scale. The count of these pulses provides an indication of the change of velocity and this quantity is transmitted to the outside sphere in the manner described above. The full velocity is accumulated in an external register and is used both for the velocity output of the system and, properly scaled for Schuler-tuning, for feed-back to the torque motors of the stable platform.

This feed-back may be accomplished by a system similar to that described for the principal axis torquers but at a much lower power level. The transmission of the commands to the inner sphere may again be by digital code and a transistorized or other switching device may be used to apply the correctly proportioned pulses of torquing power to the precession axis torquer. Systematic corrections can also be provided to the gyros by this same means.

The remaining function in the orientation sub-system is that of properly aligning the inner sphere with reference to North or some other desired azimuthal reference. This function can be performed by comparing the azimuth position of the platform, as indicated by the output sub-system, with the desired position and developing an appropriate error signal for the Z axis gyro.

The output sub-system is based upon the equator-meridian geometry discussed in detail above and may be instrumented by any of the techniques discussed in connection therewith. While the output transducers are necessarily a portion of the inertial velocity meter, their receiving system counterparts, which might provide an output shaft angle or modified output, are often more optimumly packaged as a portion of related equipment. Related digital equipment of a type well known in the art is also conveniently externally packaged for handling control or information data. Thus, pulse coded commands originating outside the platform may be directed to internal circuitry which identifies the command and directs it to the appropriate internal device. Actuating signals may also be channeled to appropriate torque devices and measurement signals directed to the voltage digitizing devices or registers whose outputs are read out and fed to external circuitry for processing. Such circuitry and equipment is well-known in the art and is readily adaptable to the single channel multiplexing contemplated by the spherical construction of the platform of the present invention.

If the gyros or other components used require temperature stabilization, this may be accomplished by several different techniques. These techniques include individual component heaters, use of the principal axis torque motor's fixed phase as heating elements, and complete measurement unit temperature stabilization by elements disposed in the outer sphere.

As noted above, the essential features of the present invention are the provision of an inner hollow sphere, hydraulically supported within an outer sphere (the inner sphere being adapted to receive any conventional stabilizing means such as gyros and accelerometers); and provision for simultaneously transmitting electrical power, sensor signals, angular position information, and the required torques between the spheres. The construction of the spheres, the manner of transmitting power and signals between the spheres for any relative position thereof, and the manner of exerting the necessary torques has been described in detail above. It will, of course, be understood that the foregoing description of related stabilization and control equipment is exemplary only since such equipment as such is well known in the art and does not form a part of the present invention. The particular type of stabilization and control equipment which is utilized in any particular application will of course depend upon the requirements of that application. For any such application, the advantages to be derived from the hydraulically and spherically supported type of construction will be obvious to those skilled in the art.

It can, for example, be shown by analog computer analysis of the equations of motion of the hydraulically and spherically supported inertial reference construction, that there are no terms in the equations of motion which cause a disturbance of the stable platform due to the angular acceleration of the gimbals such as commonly occur in conventional constructions. Further, the effects of a rectified torque in specifically gimballed structures which is generated by the simultaneous phased angular velocities of a gimbal member about two of its axes are also eliminated. Because of these two simplifying conditions, the torque reserve in the principal axis torquers of the device of the present invention may be substantially less than that for conventional constructions without compromising the operation of the unit. Because of the inherent symmetry of the spheres, the equations for all three control loops are identical and there are no cross couplings between them.

A further dynamic advantage of the spherical construction is less evident but is of great importance in the application of stable platforms to missile environments. This effect is similar to the rectified torque effect caused by oscillated gimbal structure but relates to the compound angular velocities of the gyro structure within the precession axis. For the case of normal disturbing functions, these oscillations and the torque which is generated about the precession axis as a result of their phase relationship are of infinitesimal significance. However, with the larger driving functions created by gimbal accelerations, this torque can cause a precession of the stable platform at many times the normal drift rate. This consideration is one which frequently necessitates the use of an all-attitude configuration in applications where the requirement for freedom of aircraft attitude does not in itself demand the all-attitude configuration. With the spherical construction described herein, the gimbal accelerations which cause this effect are eliminated.

While the principles of the invention have now been made clear, there will be immediately obvious to those skilled in the art many modifications in structure, arrangement, proportions, the elements and components used in the practice of the invention and otherwise, which are particularly adapted for specific environments and specific operating requirements without departing from those principles. The appended claims are therefore intended to cover and embrace any such modifications within the limit only of the true spirit and scope of the invention.

I claim as my invention:

1. Apparatus comprising a first hollow sphere,
a second hollow sphere surrounding said first sphere,
the outer diameter of said first sphere being slightly less than the inner diameter of said second sphere,
said first sphere being substantially supported within said second sphere by a fluid between said spheres,
said second sphere being substantially free to rotate in any direction about said first sphere,
stabilizing means therefor in said first hollow sphere including a plurality of gyroscopes with driving means therefor to main angular orientation of said first sphere with respect to predetermined external axes,
electrical orientation-sensing and reporting means acting between said spheres,
a plurality of electrically conductive spherical segments symmetrically disposed on the inner surface of each quadrant of said second sphere,
said segments being separated from each other by narrow strips of insulation,
a plurality of centering means protruding from the outer surface of said first sphere and making contact with said segments on the inner surface of said second sphere, at least one opposed pair of said centering means consisting of electrically conductive material cooperating with said conductive segments and being connected in a circuit including a plurality of adjacent and preselected ones of said conductive spherical segments to transmit relative angular orientation reporting signals between said spheres,
a plurality of wound torque motor stator portions mounted on the outer surface of said first sphere,
said conductive segments on the inner surface of said second sphere having portions forming non-oriented rotor portions for said stators to form torque motors,
said plurality of torque motors acting as part of said stabilizing means and being connected to be controlled by said gyroscopes to maintain said first sphere in a predetermined orientation with respect to said predetermined set of axes independently of the motions of said second sphere.

2. Apparatus comprising a first hollow sphere,
a second hollow sphere surrounding said first sphere,
the outer diameter of said first sphere being slightly less than the inner diameter of said second sphere,
said first sphere being substantially hydraulically supported within said second sphere,
said second sphere being substantially free to rotate in any direction about said first sphere,
a stabilizing means in said first hollow sphere including a plurality of gyroscopes with driving means therefor to maintain said first sphere in a predetermined orientation with respect to a predetermined set of external axes independently of the motions of said second sphere,
the inner surface of said second sphere comprising a plurality of electrically conductive spherical segments separated from each other by narrow strips of insulation, means including pre-selected ones of said conductive segments for transmitting electrical power and signals between said spheres,
and means to indicate the relative angular orientation of said spheres comprising capacitive pick-off potentiometer means having at least one signal transmitting element mounted on the inner surface of said second sphere,
said capacitive pick-off potentiometer means being positioned and connected to measure the relative angular positions of said spheres.

3. Vehicle guidance apparatus comprising:
a first sphere,
a second hollow sphere surrounding said first sphere,
the outer diameter of said first sphere being slightly less than the inner diameter of said second sphere,
said second sphere being substantially free to rotate in any direction about said first sphere which is substantially hydraulically and floatation supported therein free of pivots,
stabilizing means to maintain said first sphere in a predetermined orientation with respect to a predetermined set of axes independently of the motions of said second sphere including a plurality of gyroscope means in said first sphere and
means to sense and report the angular relation between said spheres comprising
first signal transmitting means extending along 360° of an equator on the outer surface of said inner sphere,
second signal transmitting means extending along 180° of a meridian on the outer surface of said inner sphere,
first signal receiving means extending along 360° of an equator on the inner surface of said outer sphere,
second signal receiving means extending along 180° of a first meridian on the inner surface of said outer sphere,
third signal receiving means extending along 180° of a second meridian displaced 90° along said equator from said first meridian on said inner surface of said outer sphere and
means to determine the intersection point of at least one of said signal transmitting means and one of said signal receiving means to measure to relative angular position of said spheres.

4. Vehicle guidance apparatus comprising:
a first hollow sphere,
a second hollow sphere surrounding said first sphere,
the outer diameter of said first sphere being slightly less than the inner diameter of said second sphere,
said first sphere being substantially hydraulically supported within said second sphere,
said second sphere being substantially free to rotate in any direction about the first sphere,
means in said first hollow sphere to stabilize it including a plurality of gyroscope means,
orientation-sensing means acting between said spheres,
a plurality of electrically conductive segments insulated from each other on the inner surface of said second sphere,
a plurality of centering means protruding from the outer surface of said first sphere and making contact with the inner surface of said second sphere,
at least two of said centering means consisting of electrically conductive material,
means connecting said conductive centering means in an electrical circuit to transmit electrical power and electrical signals reporting said orientation sensing between said spheres,
signal receiving means mounted between at least two of said electrically conductive segments on the inner surface of said second sphere,
signal transmitting means mounted on the outer surface of said inner sphere,
said signal transmitting means and said signal receiving means coacting to provide a measure of the relative angular position of said spheres,
a plurality of wound torque motor stator elements on the outer surface of said inner sphere,
said conductive segments on the inner surface of said outer sphere coacting with said wound stators to provide rotor elements to cooperate with said motor stators and form torque motors and
said means to stabilize also including said torque motors connected to be controlled by said gyroscope means to maintain said first sphere in a predetermined orientation with respect to a predetermined set of axes independently of the motions of said second sphere.

5. Vehicle guidance apparatus comprising:
a first hollow sphere,
a second hollow sphere concentric with and surrounding said first sphere,
the outer diameter of said first sphere being slightly less than the inner diameter of said second sphere,
said first sphere being substantially hydraulically supported within said second sphere,
said second sphere having a pivotless mounting to be substantially free to rotate in any direction about said first sphere,
stabilizing means including a plurality of gyroscopes in said first sphere in a predetermined orientation with respect to a predetermined set of external axes independently of motions of said second sphere,
means to sense and report the relative angular orientation between said spheres,
means to transmit electrical signals for the orientation sensing between said spheres for the control of the orientation reported by said electrical signals,
motor means also acting across said hydraulic support to exert a relative torque between said spheres,
said stabilizing means including said motor means to aid in maintaining said first sphere in its said predetermined orientation despite angular movements between said spheres.

6. Vehicle guidance apparatus comprising:
a hollow inner sphere,
a hollow outer sphere concentric with and surrounding said inner sphere,
the outer diameter of said inner sphere being slightly less than the inner diameter of said outer sphere,
said inner sphere being substantially hydraulically supported within said outer sphere for pivotless angular motions therein,
said outer sphere having substantially free and pivotless rotatability in any angular direction about said inner sphere,
stabilizing means therefor in said hollow inner sphere including a plurality of gyroscope units to hold said inner sphere oriented to coordinates external to said vehicle,
angular orientation sensing means acting between said two spheres to indicate their relative angular positions and
means to transmit electrical signals for said orientation sensing means between said spheres,
said stabilizing means including a plurality of torquing motor units acting between said two spheres and operatively controlled by said gyroscope units to maintain said inner sphere in a predetermined angular orientation with respect to said coordinates external to said vehicle substantially independently of the motions of said outer sphere.

7. Vehicle guidance apparatus comprising:
a hollow inner sphere,
a hollow outer sphere surrounding said inner sphere,
the outer diameter of said inner sphere being slightly less than the inner diameter of said outer sphere,
said inner sphere being substantially hydraulically supported within said outer sphere for substantially unrestrained angular motions in all directions, whereby said outer sphere is substantially free to rotate in any angular direction about said inner sphere,
stabilizing gyroscopic means in said hollow inner sphere to maintain said inner sphere in a predetermined orientation with respect to a predetermined set of axes external to said vehicle substantially independently of the motions of said outer sphere,
sensing means acting between said two spheres to continuously measure and report the relative angular positions of said spheres,
centering means for said inner sphere comprising a plurality of centering elements protruding from the surface of one of said spheres and making contact with the surface of the other of said spheres,
at least two of said centering elements consisting of electrically conductive material and the cooperating surfaces of the other of said spheres having conductive segments and
means connecting said conductive centering means in a plurality of electrical circuits to electrically report the relative angular positions of said spheres.

8. Vehicle guidance apparatus providing a hydraulically and only spherically supported stable guidance platform comprising:
a hollow inner sphere,
a hollow outer sphere surrounding said inner sphere,
the outer diameter of said inner sphere being slightly less than the inner diameter of said outer sphere,
said inner sphere being substantially floatation supported within said outer sphere by a fluid between said spheres to provide a pivotless substantial freedom of rotation of said outer sphere about said inner sphere in any angular direction,
stabilizing means in said inner sphere to maintain it in a predetermined orientation with respect to a predetermined set of external axes substantially independent of said vehicle and substantially independently of the motions of said outer sphere,
sensing means acting between said spheres to measure and report the relative angular positions of said spheres, contact means acting between said spheres to transmit angular position reporting electrical signals therebetween and
means to exert relative torques between said spheres about a plurality of axes under the effective control of said stabilizing means, said last means comprising a plurality of electric motor units corresponding to said plurality of axes and acting between said spheres and connected to be controlled by said stabilizing means.

9. A hydraulically and spherically supported stable platform comprising:
a first hollow sphere,
a second hollow sphere surrounding said first sphere,
the outer diameter of said first sphere being slightly less than the inner diameter of said second sphere,
said first sphere being substantially hydraulically supported within said second sphere,
said second sphere being substantially free to rotate without pivots between said spheres in any direction about said first sphere,
stabilizing means in said first hollow sphere comprising a plurality of gyroscope units to maintain said first sphere in a predetermined orientation with respect to a predetermined set of external axes substantially independently of the motions of said second sphere and electrical circuit and contact means acting between said spheres to measure and transmit the signals for the relative angular orientation between said two spheres comprising
   first signal-transmitting means mounted along 360° of an equator or the outer surface of said second sphere,
   second signal-transmitting means mounted along 180° of a meridian on the outer surface of said first sphere,
   first signal-receiving means mounted along 360° of an equator on the inner surface of said second sphere,
   second signal-receiving means mounted along 180° of a first meridian on the inner surface of said second sphere and
   third signal-receiving means mounted along 180° of a second meridian displaced 90° from said first meridian on said inner surface of said second sphere.

10. All attitude, vehicle guidance apparatus comprising:
a hollow inner sphere,
a concentric, hollow, relative close fitting, and vehicle-supported outer sphere pivotlessly substantially supporting said inner sphere by floatation of fluid therebetween to be substantially freely rotatable in all directions relative thereto,
stabilizing means in said hollow inner sphere including a plurality of gyroscope means to always hold it angularly oriented relative to external coordinates independent of said vehicle,
a plurality of accelerometer units indicating values along a plurality of said external coordinates,
sensing means acting between said spheres to determine the relative angular orientation therebetween,
electrical circuit forming means acting between said spheres to transmit signals from said inner sphere to said outer sphere and
electrical torquing motors acting between said spheres under the effective control of said gyroscope means.

11. Guidance platform apparatus comprising:
a hollow inner sphere,
a concentric outer sphere substantially hydraulically supporting said inner sphere in fluid in said outer sphere for substantially free relative angular motions in all directions between said spheres,
stabilizing means in said inner sphere to always maintain said inner sphere in a predetermined orientation relative to an external set of spatial coordinates including at least three gyroscope units,
at least two accelerometer units in said inner sphere to determine values along at least two of said spatial coordination,
common circuit forming means acting between said two spheres to transmit electrical power to said inner sphere and also to transmit pulsed electric commands and signals between said spheres,
at least three angular pick-off units acting through said fluid between said spheres to indicate the angular positions of said outer sphere relative to the stable inner sphere and its said spatial coordinates and at least three torque producing electric induction type motor means acting across said fluid between said spheres and connected to be effectively controlled by said gyroscope units.

12. An unlimited attitude and pivotlessly supported, stable platform apparatus for a vehicle comprising:
a hollow inner sphere,
a concentric hollow outer sphere including attachment means to pivotlessly mount it on a vehicle to have substantially all angular motions thereof,
centering and supporting means comprising fluid between said spheres substantially hydraulically supporting said inner sphere in said fluid for pivotless and substantially free relative angular motions in all directions between said spheres,
stabilizing means, including a plurality of gyroscope means, in said inner sphere to hold it oriented relative to an external set of coordinates substantially independently of all angular motions of the vehicle with its attached outer sphere,
means to transmit electrical power and signals between said spheres without appreciable interference with free angular motions therebetween and
angular position indicating and reporting means acting between said spheres to indicate the angular orientations for all the unlimited attitudes of the vehicle and its attached outer sphere relative to the stable inner sphere and its said external coordinates,
said angular orientations reported by said angular position indicating means being transmitted by said signals between said spheres to help control said stabilizing means in said inner sphere.

13. A pivotlessly supported, stable platform and unlimited attitude, guidance and course control apparatus for a vehicle comprising:
concentric hollow inner and outer spheres,
said outer sphere having pivotless means to attach it in a vehicle to have substantially all angular motions thereof,
pivotless means centering and substantially hydraulically supporting said inner sphere in fluid between said spheres for pivotless and substantially free angular motions in all directions relative to said outer sphere,
means including a plurality of gyroscope units in said inner sphere to hold it oriented relative to an external set of coordinates,
means to transmit electrical power and signals between said spheres without appreciable interference with free angular motions therebetween,
angular position indicating and reporting means acting electrically between said spheres to indicate the angular orientations for all the unlimited attitudes of the vehicle and its attached outer sphere relative to the stable inner sphere and its said external coordinates and vehicle course control means connected to be controlled by said electrical angular position indicating means,
said angular orientations reported by said angular position indicating means being transmitted by said signals between said spheres to help control said stabilizing means in said inner sphere.

References Cited in the file of this patent
UNITED STATES PATENTS

| | | |
|---|---|---|
| 1,501,886 | Abbot | July 15, 1924 |
| 1,589,039 | Anschutz-Kaempfe | June 15, 1926 |

(Other references on following page)

UNITED STATES PATENTS

| | | |
|---|---|---|
| 1,837,292 | Richter | Dec. 22, 1931 |
| 1,838,084 | Drake | Dec. 29, 1931 |
| 1,972,882 | Gillmor | Sept. 11, 1934 |
| 1,986,807 | Gillmor | Jan. 8, 1935 |
| 2,393,473 | Jones | Jan. 22, 1946 |
| 2,835,131 | Vacquier et al. | May 20, 1958 |
| 2,855,781 | Alburger | Oct. 14, 1958 |
| 2,866,146 | Rodriguez | Dec. 23, 1958 |
| 2,903,891 | Sedgefield et al. | Sept. 15, 1959 |
| 2,960,878 | Lees | Nov. 22, 1960 |

FOREIGN PATENTS

| | | |
|---|---|---|
| 558,539 | Germany | Sept. 8, 1932 |